United States Patent [19]
Kinoshita

[11] Patent Number: 5,274,546
[45] Date of Patent: Dec. 28, 1993

[54] DIAGNOSIS SYSTEM OF NUMERICAL CONTROL APPARATUS

[75] Inventor: Jiro Kinoshita, Minamitsuru, Japan
[73] Assignee: Fanuc Ltd, Minamitsuru, Japan
[21] Appl. No.: 924,577
[22] PCT Filed: Aug. 22, 1989
[86] PCT No.: PCT/JP89/00855
§ 371 Date: Apr. 18, 1990
§ 102(e) Date: Apr. 18, 1990
[87] PCT Pub. No.: WO90/02981
PCT Pub. Date: Mar. 22, 1990

Related U.S. Application Data
[63] Continuation of Ser. No. 474,034, Apr. 18, 1990, abandoned.

[30] Foreign Application Priority Data
Sep. 2, 1988 [JP] Japan ................ 63-219864

[51] Int. Cl.⁵ ............... G05B 19/405; G06F 11/22
[52] U.S. Cl. .................. 364/186; 364/474.19; 371/8.1; 371/16.1
[58] Field of Search ......... 364/474.11, 474.16, 364/474.19, 186, 551.02; 371/8.1, 9.1, 16.1, 16.4

[56] References Cited
U.S. PATENT DOCUMENTS

| | | | |
|---|---|---|---|
| 3,882,305 | 5/1975 | Johnstone | 364/474.22 |
| 4,282,584 | 8/1981 | Brown et al. | 364/186 |
| 4,456,951 | 6/1984 | Henneberger et al. | 364/131 |
| 4,511,982 | 4/1985 | Kurakake | 364/167 |
| 4,536,849 | 8/1985 | Borisch et al. | 364/474.19 |
| 4,992,712 | 2/1991 | Fujimoto et al. | 318/569 |
| 5,124,622 | 6/1992 | Kawamura et al. | 318/569 |

Primary Examiner—Jerry Smith
Assistant Examiner—Paul Gordon
Attorney, Agent, or Firm—Staas & Halsey

[57] ABSTRACT

Disclosed is a diagnosis system of a numerical control system (CNC) for monitoring an internal state of the CNC, wherein a processor (11) of the CNC acts as a host processor, and a diagnostic processor (1) monitors the processor (11) for the CNC or other processors (18a, 24) in a usual CNC operation mode, and the diagnostic processor (1) executes software for diagnosing the processor (11) for the CNC and the other processors (18a, 24), as the host processor, to detect a cause of malfunction of the CNC, whereby the time required for a normal operation is shortened, when a malfunction occurs, and the operational reliability is thus improved.

3 Claims, 1 Drawing Sheet

DIAGNOSIS SYSTEM OF NUMERICAL CONTROL APPARATUS

This application is a continuation, of application Ser. No. 07/474,034, filed Apr. 18, 1990, now abandoned.

BACKGROUND OF THE INVENTION

1. Field of the Invention

The present invention relates to a diagnosis system for monitoring the interior state of a numerical control apparatus (CNC), and more specifically, to a CNC diagnosis system provided with a diagnostic processor.

2. Description of the Related Art

Numerical control apparatuses and robot control apparatuses utilize a multi-processor system including a plurality of processors, to enable simultaneous control of a multiplicity of axes. These control apparatuses comprise a plurality of the processors, many kinds of memories, a multiplicity of I/O interfaces, a position control circuit and the like, and if a malfunction occurs in any one of these elements, it is often difficult to detect exactly which element has malfunctioned.

To cope with this problem, the statuses of the internal memories, I/O signals and the like are displayed at a display, but when a malfunction occurs in a processor itself, it is difficult to detect the cause of the malfunction when only the statuses of the internal memories, I/O signals and the like are displayed, thus it often takes considerable time to restore a numerical control apparatus to normal operation.

SUMMARY OF THE INVENTION

Taking the above into consideration, an object of the present invention is to provide a CNC diagnosis system utilizing a diagnostic processor.

To solve the above problem, there is provided a diagnosis system of a numerical control apparatus (CNC) for monitoring an internal state of the CNC, wherein a processor for the CNC acts as a host processor, and a diagnostic processor monitors the processor for the CNC or other processors in a usual CNC operation mode, and the diagnostic processor executes software for diagnosing the processor for the CNC and the other processors, as the host processor, to detect a malfunction in the CNC.

The CNC processor executes the software of the CNC, as the host processor, in a usual operating state, and the diagnostic processor monitors only the other processors.

When a malfunction occurs, the CNC is switched to a diagnosis mode and the diagnostic processor executes the diagnostic software, as the host processor, and diagnoses the other processors to thereby detect the cause of malfunction.

DESCRIPTION OF THE PREFERRED EMBODIMENT

Figure 1:
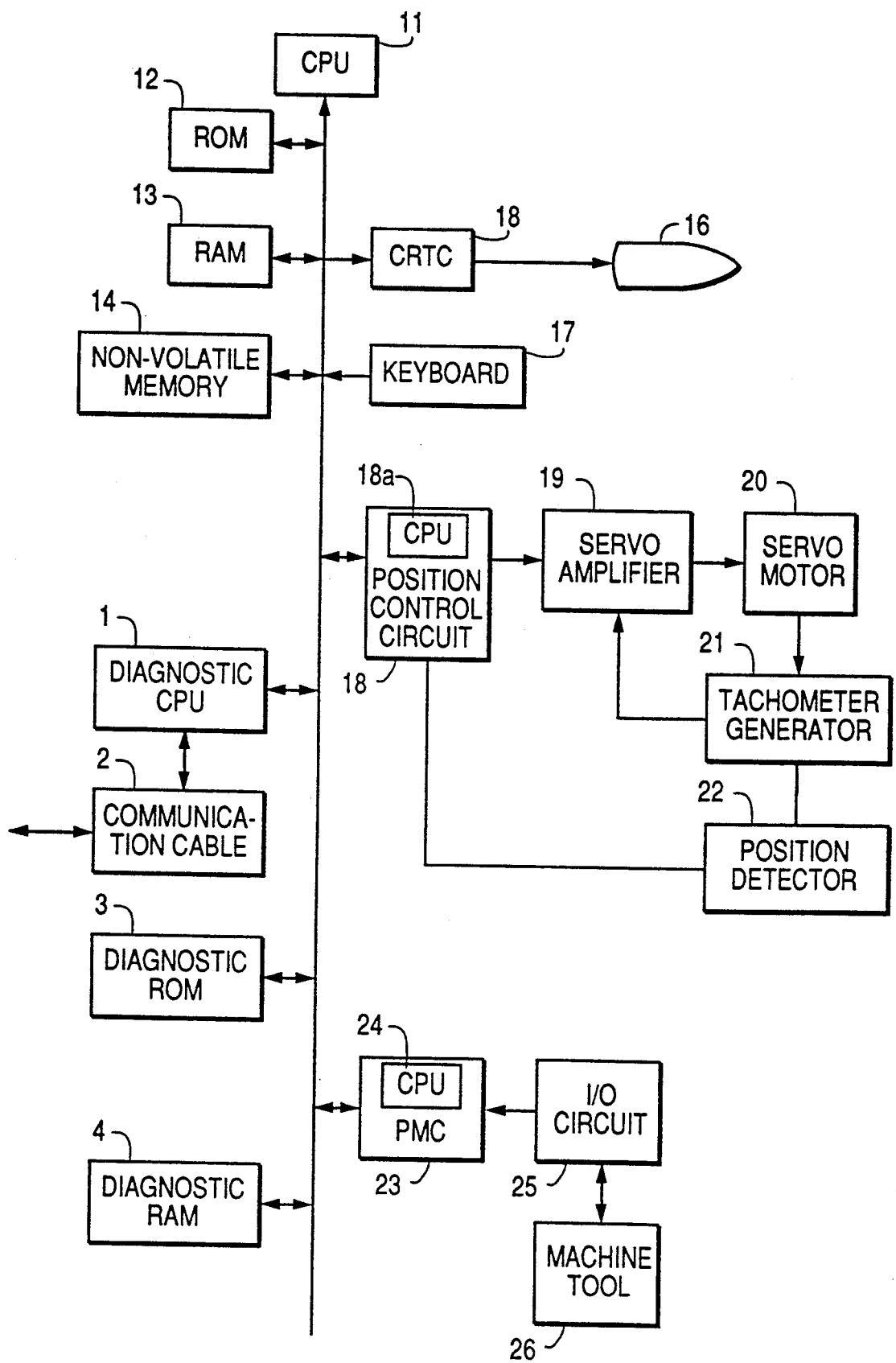
FIG. 1 is a block diagram of a numerical control apparatus (CNC) as an embodiment of the present invention.

An embodiment of the present invention will be describe below with reference to a drawing.

FIG. 1 shows a hardware arrangement of a numerical control apparatus (CNC) as the embodiment of the present invention, wherein 1 designates a diagnostic processor which usually monitors other processors but executes diagnostic software in a diagnosis mode to detect the cause of a malfunction in the other processors.

Numeral 2 designates a communication port for connecting the diagnostic processor 1 with an external host computer through a communication line, and receiving instructions for a diagnosis from, or transmitting the result of a diagnosis to, the host computer.

Numeral 3 designates a diagnostic ROM in which diagnostic software is stored; and 4 designates a diagnostic RAM which stores diagnostic software transmitted from the host computer, or temporarily stores diagnostic data to be transmitted to the host computer.

Numeral 11 designates a processor for controlling the CNC as a whole; 12 designates a ROM in which a control program is stored; 13 designates a RAM in which various data is stored; and 14 designates a non-volatile memory in which a machining program, parameters and the like are stored, and comprises a CMOS or the like backed up by a battery.

Numeral 15 designates a display control circuit for converting a digital signal to a video signal; 16 designates a display unit, which is a CRT, a liquid crystal display unit or the like; and 17 designates a keyboard for inputting various data.

Numeral 18 designates a position control circuit for controlling a servo motor; 19 designates a servo amplifier for controlling a speed of the servo motor; 20 designates the servo motor; 21 designates a tachometer generator for a speed feed back; and 22 designates a position detector and pulse coder, which comprises an optical scale or the like. Although as many of these elements as the number of axes are installed, the elements only for one axis are shown here. The position control circuit 18 also contains an exclusive position control processor 18a, usually one CNC unit is provided with two to five of these processors. These position control processors 18a are also subjected to diagnosis to detect a malfunction thereof.

Numeral 23 designates a programmable machine controller (PMC) for receiving instructions such as an M function, T function and the like, after converting same to signals, outputting them to thereby control a machine tool; 24 designates a processor for con&rolling the PMC 23; and 25 designates an I/O circuit connected to the machine tool 26 for receiving and transmitting digital signals from and to such an external unit.

In a usual operation, the processor 11 controls the CNC as a whole, as a host processor for the overall CNC. The diagnostic processor 1 monitors only the processor 11, the position control processor 18a, and the processor 24 for the PMC, and when an abnormal state is detected, displays same at the display unit 16.

When a malfunction of the CNC occurs and the cause thereof must be detected, the CNC is switched to a diagnosis mode and the diagnostic processor 1, as the host processor, executes the diagnostic software.

The diagnostic software may be prestored in the diagnostic ROM 3, or transmitted from an external host computer and stored in the diagnostic RAM 4 as necessary. When the CNC is not connected to the host computer, the diagnostic software must be stored in the diagnostic ROM 3. Further, when the CNC is connected to the host computer, suitable diagnostic software can be transmitted to the diagnostic RAM 4 and executed in accordance with the cause of the malfunction. In this case, the result of a diagnosis can be transmitted to the host computer through the communication port 2, and processed thereby. For example, a service engineer working at the host computer can diagnose a malfunction without the necessity to actually go and inspect the CNC.

As described above, according to the present invention, since the diagnostic processor is provided to diagnose the other processors in the diagnosis mode, the time required for restoring a normal operation is shortened after a malfunction has occurred, and thus the operational reliability is improved

I claim:

1. A diagnosis system of a numerical control apparatus, connectable to an external processor for instructing operation, having a main processor for acting as a host processor controlling other processors in a usual operation mode, comprising:
   a diagnostic processor, connected to said main and other processors, for monitoring said main processor and said other processors during the usual operation mode and for acting as the host processor in a diagnosis mode to detect a cause of a malfunction of said numerical control apparatus;
   a communication line, connected to said diagnostic processor, for receiving externally originated diagnostic software in accordance with the cause of the malfunction from the external processor for instructing operation of said numerical control apparatus; and
   a diagnostic RAM, connected to said diagnostic processor, for storing the externally originated diagnostic software received via said communication line.

2. A diagnosis system according to claim 1, further comprising a diagnostic ROM, connected to said diagnostic processor, for storing internally stored diagnostic software.

3. A numerical control apparatus connectable to a host computer for instructing operation thereof, comprising:
   a plurality of operational processors, including a main processor controlling operation of said numerical control apparatus during a usual operation mode;
   a bus connected to said operational processors, including said main processor;
   a diagnostic processor, connected to said bus, for monitoring said operational processors, including said main processor, during the usual operation mode and for controlling operation of a said numerical control apparatus in a diagnosis mode to detect a cause of a malfunction of said numerical control apparatus; and
   a communication line, connected to said diagnostic processor, for receiving instructions from the host computer, including diagnostic software supplied in dependence upon the cause of the malfunction.

* * * * *